(12) United States Patent
Gettemy et al.

(10) Patent No.: US 7,911,445 B2
(45) Date of Patent: Mar. 22, 2011

(54) EXTENSION DEVICE OF HANDHELD COMPUTING DEVICE

(75) Inventors: Shawn R. Gettemy, San Jose, CA (US); Sherridythe A. Fraser, San Jose, CA (US); Kevin Lee, San Jose, CA (US); William R. Hanson, Mountain View, CA (US); Yoon Kean Wong, Redwood City, CA (US); Mark W. Oliver, Fox River Grove, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1067 days.

(21) Appl. No.: 11/530,430

(22) Filed: Sep. 8, 2006

(65) Prior Publication Data

US 2007/0024583 A1 Feb. 1, 2007

Related U.S. Application Data

(63) Continuation of application No. 10/085,945, filed on Feb. 28, 2002, now abandoned.

(51) Int. Cl.
*G09G 5/00* (2006.01)
(52) U.S. Cl. .................................. 345/156; 345/7; 345/8
(58) Field of Classification Search .................. 345/156, 345/173, 179, 8, 7; 455/566, 556.2, 550.1, 455/412.1, 466, 349, 440, 412; 715/531, 715/541; 701/29; 709/206
See application file for complete search history.

(56) References Cited

U.S. PATENT DOCUMENTS

| 4,856,088 A | * | 8/1989 | Oliwa et al. ................. 455/349 |
| 5,020,090 A | | 5/1991 | Morris |
| 5,297,142 A | | 3/1994 | Paggeot et al. |
| 5,625,673 A | | 4/1997 | Grewe et al. |
| 5,664,228 A | | 9/1997 | Mital |
| 5,724,655 A | | 3/1998 | Grube et al. |
| 5,727,159 A | | 3/1998 | Kikinis |
| 5,797,089 A | | 8/1998 | Nguyen |
| 5,870,680 A | | 2/1999 | Guerlin et al. |
| 5,873,045 A | | 2/1999 | Lee et al. |
| 5,983,073 A | | 11/1999 | Ditzik |
| 6,034,621 A | | 3/2000 | Kaufman |
| 6,154,843 A | | 11/2000 | Hart, Jr. et al. |

(Continued)

FOREIGN PATENT DOCUMENTS

EP 1215575 A2 6/2002

(Continued)

OTHER PUBLICATIONS

Dasgupta, S. et al., "A Movable User Interface Based on a Simple X-Window Like Protocol," Gas Authority of India Ltd., Aug. 1991, pp. 199-203, vol. 3.

(Continued)

*Primary Examiner* — Prabodh M Dharia
(74) *Attorney, Agent, or Firm* — Fenwick & West LLP (57) ABSTRACT

A display system for a handheld computing device is disclosed. The display system includes a processing unit having a first communication port, and a visual display unit separable from the processing unit. The visual display unit further includes a visual display, and a second communication port. The display unit can be expanded from an initial or storage state to present a larger visual display size. Further, the first communication port providing communication with the second communication port.

12 Claims, 6 Drawing Sheets

U.S. PATENT DOCUMENTS

| | | | |
|---|---|---|---|
| 6,157,982 A | 12/2000 | Deo et al. | |
| 6,311,209 B1 | 10/2001 | Olson et al. | |
| 6,401,113 B2 | 6/2002 | Lazaridis et al. | |
| 6,463,299 B1 | 10/2002 | Macor | |
| 6,516,202 B1 | 2/2003 | Hawkins et al. | |
| 6,546,262 B1 | 4/2003 | Freadman | |
| 6,577,877 B1 | 6/2003 | Charlier et al. | |
| 6,625,472 B1 | 9/2003 | Farazmandnia et al. | |
| 6,633,759 B1 | 10/2003 | Kobayashi | |
| 6,779,019 B1 | 8/2004 | Mousseau et al. | |
| 6,792,088 B2 | 9/2004 | Takeuchi | |
| 6,847,336 B1 * | 1/2005 | Lemelson et al. | 345/8 |
| 6,867,965 B2 | 3/2005 | Khoo | |
| 6,895,220 B2 | 5/2005 | Usui | |
| 6,928,305 B2 | 8/2005 | DeWald et al. | |
| 6,947,975 B2 | 9/2005 | Wong et al. | |
| 6,957,085 B2 | 10/2005 | Shin et al. | |
| 6,999,792 B2 | 2/2006 | Warren | |
| 7,003,308 B1 * | 2/2006 | Fuoss et al. | 455/466 |
| 7,013,112 B2 | 3/2006 | Haller et al. | |
| 7,016,704 B2 | 3/2006 | Pallakoff | |
| 7,027,035 B2 | 4/2006 | Youden | |
| 7,047,038 B1 | 5/2006 | Macor | |
| 7,054,594 B2 | 5/2006 | Bloch et al. | |
| 7,095,387 B2 * | 8/2006 | Lee et al. | 345/4 |
| 7,110,752 B2 | 9/2006 | Okajima | |
| 7,177,665 B2 | 2/2007 | Ishigaki | |
| 7,224,991 B1 * | 5/2007 | Fuoss et al. | 455/466 |
| 7,342,571 B2 * | 3/2008 | Fraser et al. | 345/169 |
| 7,630,717 B2 * | 12/2009 | Feher | 455/440 |
| 2002/0151283 A1 | 10/2002 | Pallakoff | |
| 2003/0083047 A1 * | 5/2003 | Phillips et al. | 455/412 |
| 2003/0098857 A1 * | 5/2003 | Gettemy et al. | 345/173 |
| 2003/0160735 A1 * | 8/2003 | Lee et al. | 345/4 |
| 2003/0160755 A1 * | 8/2003 | Gettemy et al. | 345/156 |
| 2003/0160767 A1 * | 8/2003 | Wong et al. | 345/169 |
| 2003/0160771 A1 * | 8/2003 | Fraser et al. | 345/204 |
| 2003/0233414 A1 * | 12/2003 | Henry | 709/206 |
| 2004/0006551 A1 | 1/2004 | Sahinoja et al. | |
| 2005/0131596 A1 * | 6/2005 | Cherrington et al. | 701/29 |
| 2007/0030211 A1 * | 2/2007 | McGlone et al. | 345/7 |
| 2007/0069975 A1 * | 3/2007 | Gettemy et al. | 345/1.3 |
| 2007/0290989 A1 * | 12/2007 | Gettemy et al. | 345/156 |
| 2008/0032755 A1 * | 2/2008 | Fraser et al. | 455/575.1 |
| 2008/0238813 A1 * | 10/2008 | Gettemy et al. | 345/1.3 |

FOREIGN PATENT DOCUMENTS

| | | |
|---|---|---|
| EP | 1330098 A1 | 7/2003 |
| WO | WO 99/26159 A2 | 5/1999 |

OTHER PUBLICATIONS

PCT International Search Report and Written Opinion, PCT/US2006/014060, Sep. 1, 2006, 12 pages.

* cited by examiner

EXTENSION DEVICE OF HANDHELD COMPUTING DEVICE

CROSS REFERENCE TO RELATED APPLICATIONS

This application is a continuation of U.S. patent application Ser. No. 10/085,945, entitled "Detachable expandable flexible display," by Shawn R. Gettemy et al., filed on Feb. 28, 2002, which was pending by the time this application was filed and now abandoned, the content of which is hereby incorporated by reference in its entirety.

The present application is related to U.S. patent application Ser. No. 10/085,924, entitled "Wireless Detachable Display," and U.S. patent application Ser. No. 10/085,310, entitled "Interchangeable Display Modules For Portable Handheld Devices," both of which are assigned to the same assignee as the present application and are both herein incorporated by reference.

BACKGROUND

The present invention relates generally to the field of handheld computing devices. More particularly, the disclosure relates to a flexible and expandable display for a handheld computing device.

Handheld computing devices usually display data stored in memory or generated by a processor on a visual display that is slightly smaller than the size of the handheld computing device. The size of the handheld computing device is generally compact and correspondingly the visual display is significantly smaller than the size of a standard computer monitor. The small size of the screen has necessitated that handheld computing devices focus on displaying abbreviated or simplistic content.

The abbreviated or simplistic display content has not conventionally been a problem because handheld computing devices have also had limited computing power. When handheld computing devices were introduced, most people were using the devices for relatively simple applications. Traditional applications may have included an address book, a daily planner, or other similar applications that were generally not graphic intensive. These applications worked well with the smaller display screens.

However, the processing speed of handheld computing devices as well as other capabilities have been experiencing significant improvements. Handheld computing devices have improved in processor power, battery life, weight, etc. As a consequence of these improvements, handheld computing devices are now running applications that formerly could only be run on a full personal computer.

However, the amount of information that can be displayed by handheld computers is still limited to a relatively small display screen size. In fact, handheld computers have been getting more compact, and consequently so has the size of their visual display. Although the compact size offers size and weight advantages, it may be undesirable to display the full content of a screen normally displayed on a 15 inch cathode ray tube (CRT) computer monitor, on a traditional handheld computing device screen. Increasing the size of the traditional display screen would cause a corresponding increase in the size and weight of the handheld computing device.

Accordingly, there is a need for a display screen that can display data from a handheld computer on a larger screen without substantially increasing the size or weight of the handheld computing device. There is also a need for a handheld computing device having a removable, detachable display. Further, there is a need for methods of using a handheld computer to display greater amounts of image information compared with conventional displays.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a display system for a handheld computing device. The display system includes a processing unit having a first communication port, and a visual display unit separable from the processing unit. The visual display unit further includes a visual display, and a second communication port. The display unit can be expanded from an initial or storage state to present a larger visual display size. Further, the first communication port provides communication with the second communication port.

Another exemplary embodiment relates to a handheld computing device. The handheld computing device includes a processor, a first communications port attached to the handheld computing device, an information storage system, and a visual display unit detachable from the handheld computing device. Further, the visual display unit includes a visual display, and a second communication port. The visual display unit can be expanded from a compact state.

Another exemplary embodiment relates to a visual display unit for a handheld computing device. The visual display unit includes a microprocessor, a storage system, and a visual display. The visual display unit can be expanded from a compact storage state.

Another exemplary embodiment relates to a method of using a handheld computer. The method includes expanding a visual display unit from a compact state to an expanded state, and displaying information on the visual display unit to a user.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

A system and method for providing an expandable, flexible display for a handheld computing device is described. In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in block diagram form or generalized illustration form to facilitate description of the exemplary embodiments.

Figure 1:
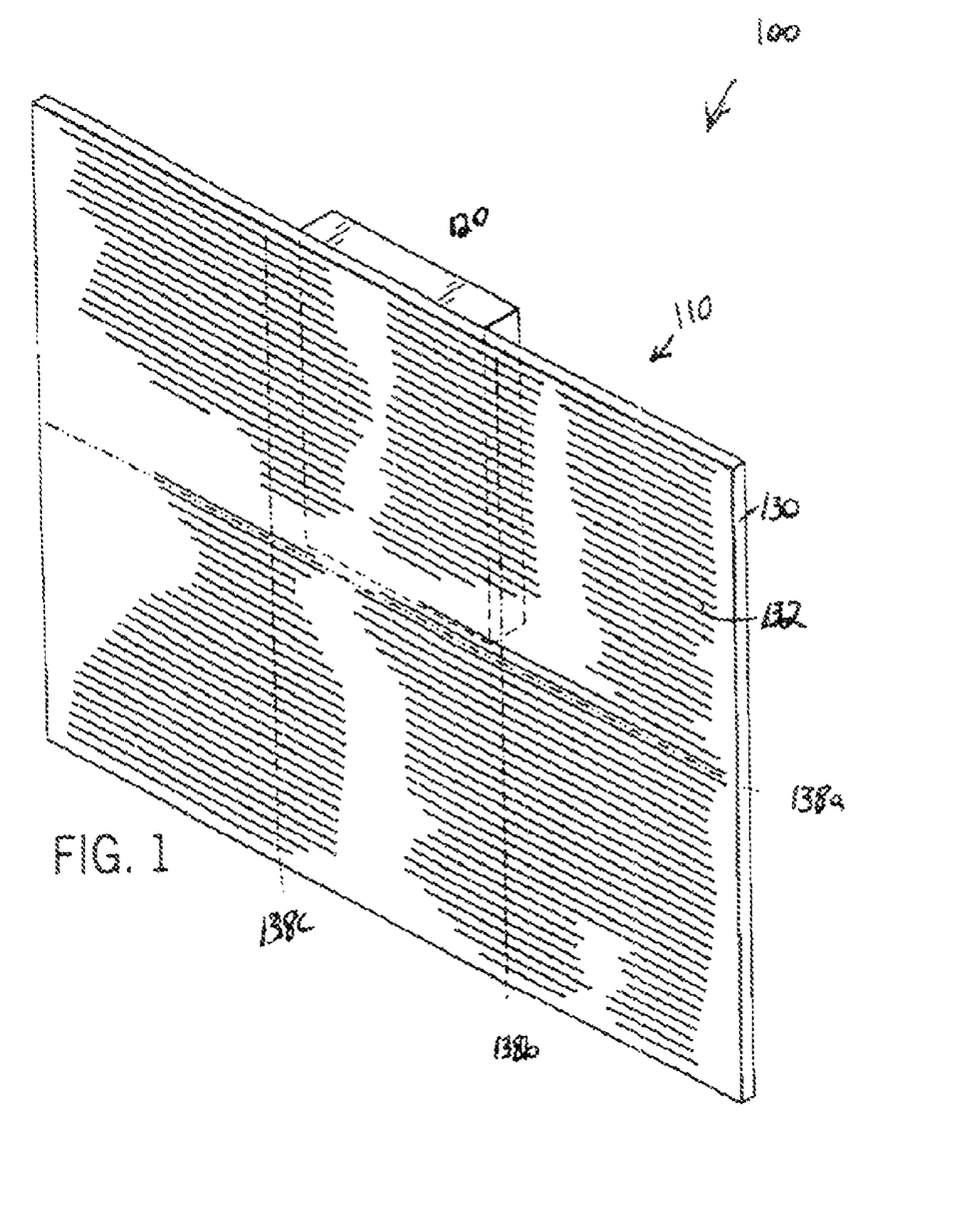
FIG. 1 is a generalized perspective view of a handheld computing device including a processing unit and a visual display unit in accordance with an exemplary embodiment.

FIG. 1 is a generalized perspective view 100 of a handheld computing device 110 including a processing unit 120 and a visual display unit 130 in accordance with an exemplary embodiment. Visual display unit 130 is a detachable visual display shown attached to processing unit 120.

Processing unit 120 can be a handheld computer, a handheld personal digital assistant, a wireless cellular digital phone, a pager, or any other such mobile device. Visual display unit 130 can be any visual display capable of displaying data transmitted from processing unit 120. Visual display unit 130 may include a visual display area 132.

Display area 132 can be an LCD screen, e-paper (such as eInk, Smart Paper™ by Gyricon Media, APD™ by Citala, etc.), or other bi-stable displays, or any other type of applicable visual display. Display area 132 may further include shutter technology to make the display, or portions thereof, selectively transparent. Visual display unit 130 is shown in FIG. 1 in a fully expanded and ready state.

According to an exemplary embodiment, visual display unit 130 can include folding points 138a through 138c. These fold lines are shown for illustrative purposes only, the display can be a solid unit or a unit that can be folded according to various configuration. According to an exemplary embodiment, folding lines 138a through 138c are configured to allow the visual display to be folded to a compact state roughly equivalent to the size of processing unit 120.

According to an exemplary embodiment, visual display unit 130 can be implemented using shutter technology. Shutter technology allows the user to force sections of display area 132 to be transparent while visual display unit 130 is in a compact state. This has the advantage of allowing the user to view data when visual display unit 130 is in a compact state and layers of the display are folded over each other. In the case of a rigid display, such as an LCD display, the layers may be hinged. In the case of a flexible display, such as e-paper, the layers may be folded, flexed, or rolled. Additionally, shutter technology can be used to make the background of a display image transparent. The data can be displayed in an opaque or semi-opaque form on the transparent display. Displaying data on a transparent display allows visual display unit 130 to be used as a transparency in conjunction with an overhead projector or other type of projector to project displayed images on a large screen.

According to another exemplary embodiment, visual display unit 130 can be implemented using a bi-stable visual display. A bi-stable visual display would allow the user to detach visual display unit 130 from a power source, either within processing unit 120 or visual display 130, and continue to view data.

According to an exemplary embodiment, visual display unit 130 can be utilized in a compact or a folded state. The user of handheld computing device 110 can view the display area 132 in the compact state. The compact state may be advantageous for viewing display area 132 while travelling or for quick access to information. According to an exemplary embodiment, the compact state can approximate the size of processing unit 120 to facilitate storage and transport of handheld computing device 110. A visual display 130 in a compact state offers all of the advantages of the traditional handheld computing device display in that it is compact and easily portable.

According to an exemplary embodiment, the user of the handheld computing device can also view the handheld computing device in an expanded state. The expanded state may be advantageous to utilize while viewing a large document or a large image. Expansion of visual display 130 may allow display of information in a manner similar to a standard computer monitor, and offer all of the advantages thereof.

Figure 2A:
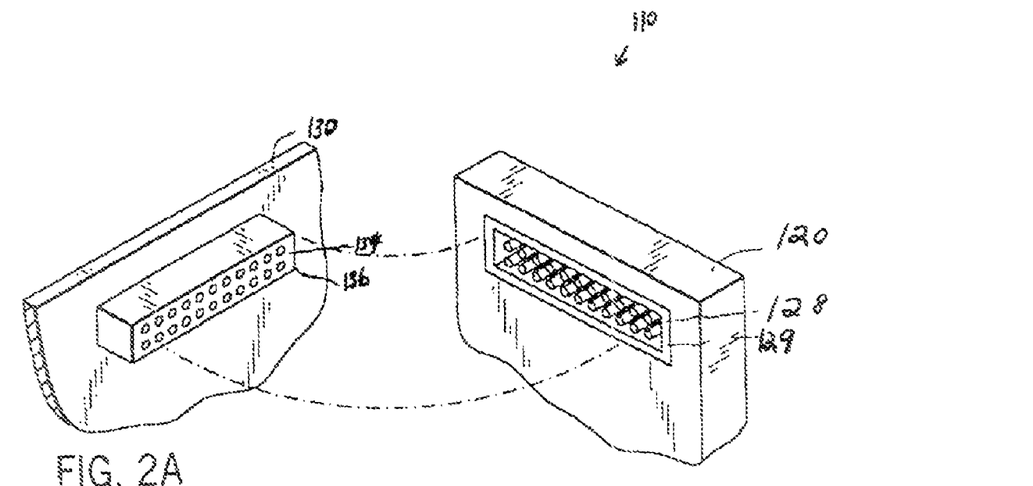
FIG. 2A is a generalized perspective view of the pin connection between the processing unit and the visual display unit in accordance with an exemplary embodiment.

FIG. 2A is a partial generalized perspective view illustrating handheld computing device 110. Processing unit 120 can include a processing unit connection port 128 enclosed in a process unit connection housing 129. Visual display unit 130 can include a visual display connection port 134 housed in a visual display connection housing 136.

Processing unit connection port 128 can further be any type of connection capable of sending and receiving data with visual display unit 130. According to an exemplary embodiment, connection port 128 can be a 24 pin input jack that mates with a mating connection port on visual display unit 130.

Processing unit connection housing 129 can be any type of housing encompassing connection port 128. According to an exemplary embodiment, processing unit connection housing 129 may be composed of the same material (or any other material) as the body of processing unit 120. Processing unit connection housing 129 could be manufactured to be of sufficient rigidity and in a form to anchor and support visual display 130. Anchoring and supporting visual display 130 can allow the user to attach visual display unit 130 to processing unit 120 when viewing or storing the visual display. This has the advantage of allowing the user to carry the handheld computing device as one unit.

Visual display connection port 134 can be any type of connection capable of sending and receiving data to and from processing unit 120. In an exemplary embodiment, connection port 134 can be a 24 pin input jack that mates with an equivalent connection port on processing unit 120.

Visual display connection 136 can be any type of housing encompassing connection port 134. According to an exemplary embodiment, processing unit connection housing 136 may be composed of the same material (or any other material)

as the body of visual display unit 130. Processing unit connection housing 136 may be manufactured to be of sufficient rigidity and form to anchor to processing unit 120. Anchoring to processing unit 120 allows the user to attach visual display unit 130 to processing unit 120 when viewing or storing the visual display. This has the advantage discussed above in reference to processing unit connection housing 129.

Figure 2B:
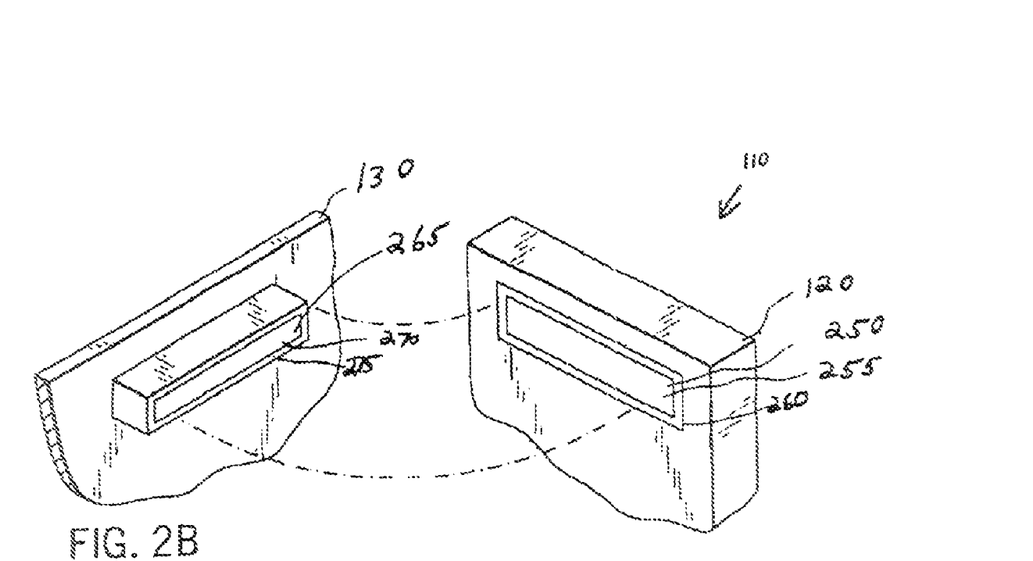
FIG. 2B is a generalized perspective view of an alternative connection between the processing unit and the visual display unit in accordance with an exemplary embodiment.

FIG. 2B is a partial generalized perspective view illustrating handheld computing device 110 including a processing unit 120 and a visual display unit 130 according to an alternative embodiment. According to an alternative exemplary embodiment, processing unit 120 can include a processing unit wireless connection port 250, wherein processing unit wireless connection port 250 can include a processing unit wireless transceiver 255. Processing unit wireless connection port 250 can be housed in a processing unit connection housing 260. Additionally, visual display unit 130 can include display unit wireless connection port 265, wherein display unit wireless connection port 265 can include a visual display unit wireless transceiver 270. Display unit wireless connection port 265 can be housed in a display unit connection housing 275.

Processing unit wireless transceiver 255 and visual display unit wireless transceiver 270 can each be devices using the Infrared Direct Access (IrDA) protocol, the Bluetooth short range radio network protocol, the IEEE 802.11 protocol, the HomeRF single wireless access protocol, the IEEE 802.11b wireless fidelity protocol, or any other protocol for sending information wirelessly from processing unit 120 to visual display system 130.

According to an exemplary embodiment, visual display unit 130 can be used to display and update data while it is detached from processing unit 120 using wireless transceivers 255 and 270. Utilizing a wireless connection has the advantage of allowing the user to store processing unit 120 on a belt, in a desk, or in another remote area, while viewing and updating data on visual display unit 130. The wireless connection also allows the user to hold up the display without supporting the relatively heavy weight of processing unit 120. According to an exemplary embodiment, the user could flip through pages of a document while holding visual display 130 in a manner similar to a newspaper.

Figure 3:
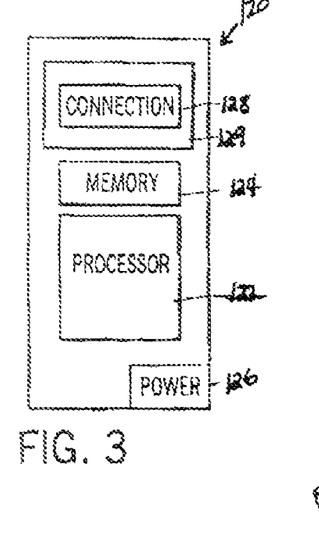
FIG. 3 is a general block diagram of the processing unit for a handheld computing device in accordance with an exemplary embodiment.

FIG. 3 is a general block diagram illustrating the components of processing unit 120. According to an exemplary embodiment, processing unit 120 can include a processing unit processor 122, a processing unit memory 124, a processing unit power source 126, and a processing unit connection port 128 enclosed in a processing unit connection housing 129. Processing unit processor 122 can be any microprocessor capable of accessing information stored in processing unit memory 124, performing actions using information from any source, and alternatively storing information in processing unit memory 124 or transmitting information to visual display unit 130.

Processing unit memory 124 can be any form of data storage. It may be at least one of random access memory (RAM) and/or read only memory (ROM). Information can be stored permanently until overwritten and/or stored temporarily for use while the unit is active.

Processing unit power source 126 can be a battery or fuel cell, a direct line from a wall outlet, current from a solar cell or any other power source sufficient to satisfy the power requirement for processing unit 120.

Figure 4:
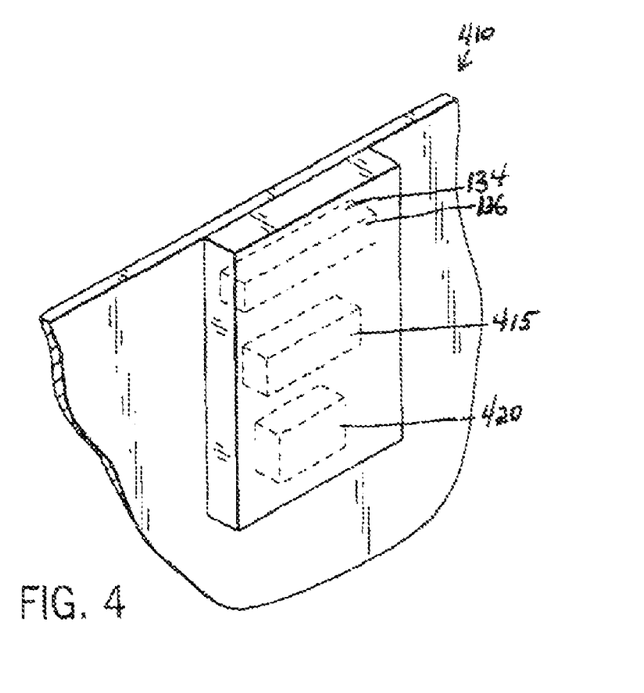
FIG. 4 is a partial generalized perspective view of an alternative visual display unit in accordance with an exemplary embodiment.

FIG. 4 is a general block diagram showing a cutaway view of an alternative visual display unit 410 according to an exemplary embodiment. Visual display unit 410 can include the same features as discussed above in reference to visual display unit 130. Specifically, visual display unit 410 can include a display unit connection port 134 housed in a display unit connection housing 136. Additionally, visual display unit 410 includes a visual display microprocessor 415 and a visual display memory 420.

Visual display microprocessor 415 can be any microprocessor capable of accessing information stored in visual display unit memory 420, performing actions on information, and alternatively storing information in visual display unit memory 420 or displaying information on a visual display area.

Visual display unit memory 420 can be any form of data storage. It may be at least one of random access memory (RAM) and/or read only memory (ROM). Information can be stored permanently until overwritten and/or stored temporarily for use while the unit is active.

According to an exemplary embodiment, visual display system 410 can utilize display unit processor 415 to store information in visual display unit memory 420. In addition, visual display system 410 can utilize display unit processor 415 to receive information from display unit connection port 134, execute instructions using that information or user input information, and display the results in the display area or store the results in display unit memory 420.

According to an exemplary embodiment, visual display system 410 can receive information from processing unit 120 while the two units are connected using connection ports 128 and 134. The information can then be stored in visual display unit memory 420. Storing information in visual display memory 420 allows the user to detach visual display unit 410 and browse the downloaded information without carrying or supporting processing unit 120.

According to an alternative exemplary embodiment wherein connection ports 250 and 265 include wireless transceivers 255 and 270 respectively, as shown in FIG. 1B, display unit processor 415 and display unit memory 420 can be used to increase slow response time caused by the limitations of wireless connections. According to an exemplary embodiment, display unit processor 415 can receive information related to the image currently being displayed in display area 132 (current display image). Display unit processor 415 can receive the information from display unit wireless transceiver 270 and store the information in display unit memory 220. According to an exemplary embodiment, the information can be data referenced by hypertext links in the current display image. According to another exemplary embodiment, the information can be a full sized image represented by a thumbnail image in the current display image. Loading information related to an image currently being displayed into memory has the advantage of dramatically speeding response time when the related information is requested for display. The process of receiving information and storing the information in display unit memory 220 can be performed in the background while a wireless connection is otherwise idle.

Figure 5:
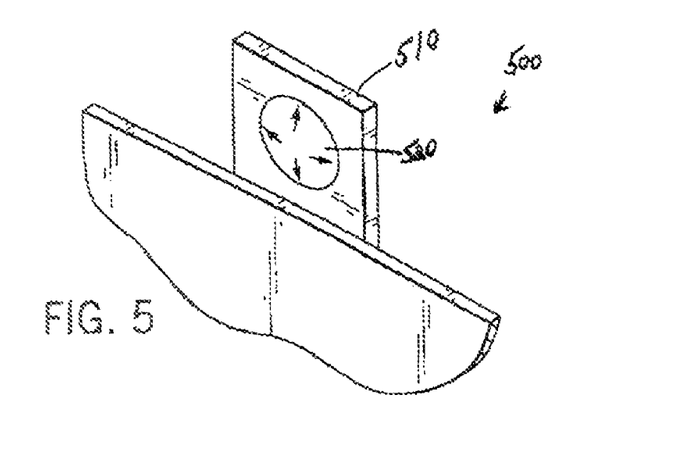
FIG. 5 is a partial generalized perspective view of an alternative visual display unit in accordance with an exemplary embodiment.

FIG. 5 is a partial generalized perspective view showing an alternative visual display unit 500 including navigation device 510 according to an exemplary embodiment. Navigation device 510 is shown as a navigation device 520 attached to visual display unit 130. According to alternative embodiments, navigation device 520 may include any of, alone, or in combination, a touch screen, voice commands, a track ball, a scrolling roller switch, or any other means to move through data displayed on visual display unit 130.

According to an exemplary embodiment, navigation device 520 could be used to provide forward and backward navigation. Navigation device 520 may be utilized to allow the user to go forward or backward through pages or discrete units of data using visual display unit 130. This has the advantage of allowing the user to navigate without utilizing the processing unit 120.

Figure 6A:
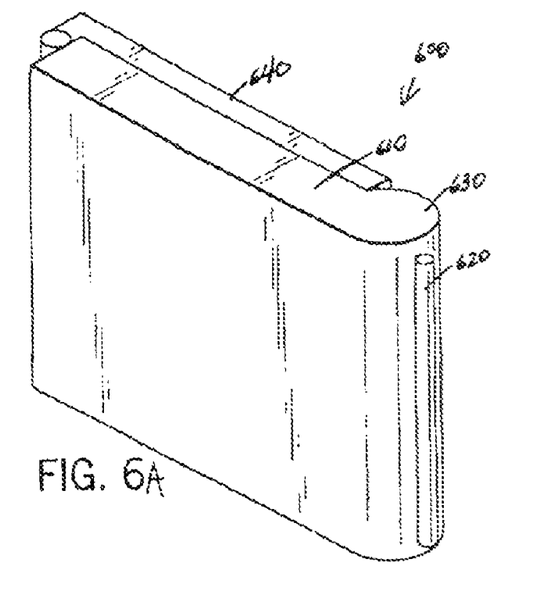
FIG. 6A is a generalized perspective view of a handheld computing device including a processing unit and a visual display unit showing an alternative method of mounting the visual display unit to the processing unit in accordance with an exemplary embodiment.

FIG. 6A is a partial generalized perspective view of an alternative handheld computing device 600 according to an exemplary embodiment. Handheld computing device 620 can include a processing unit 610, a rolled visual display unit 620, a retracting apparatus 630, and a visual display support 640. Processing unit 610 can be a processing unit similar to processing unit 120 described with reference to FIG. 3. Rolled visual display unit 620 is a visual display similar to visual display unit 130, described with reference to FIG. 1, that can be retracted and rolled using retracting apparatus 630. Visual display unit 620 can be implemented using e-paper or any other type of display that is sufficiently flexible such that it can be rolled and stored.

Retracting apparatus 630 can be any mechanism that can retract and store a flexible display. According to an exemplary embodiment, retracting apparatus 630 may include a spring and roller inside a casing to facilitate retracting and storing visual display 620.

FIG. 6A shows visual display 620 in a fully retracted state. The visual display is completely stored within retracting apparatus 630.

Figure 6B:
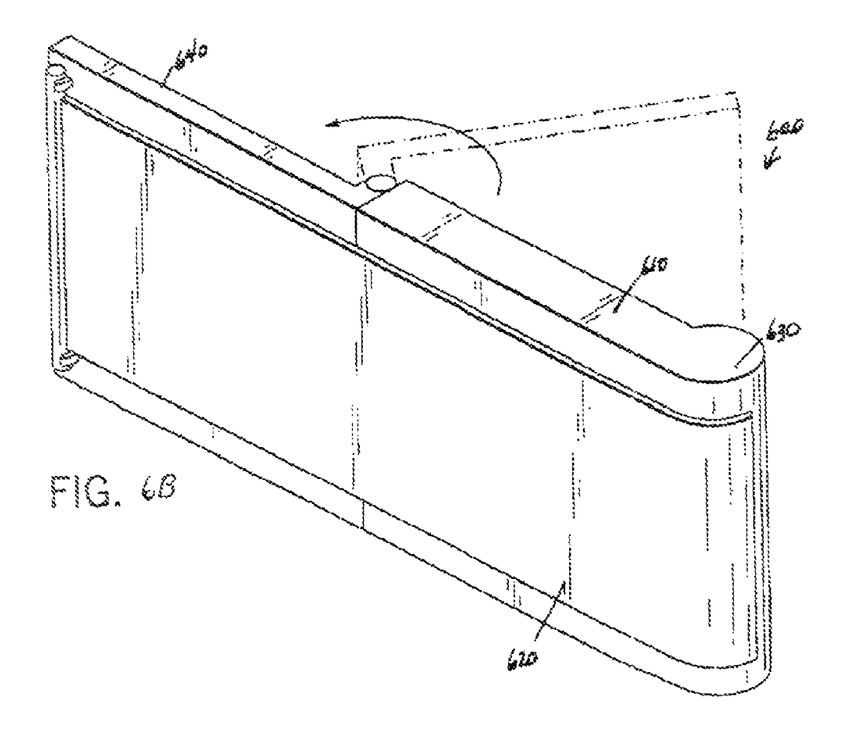
FIG. 6B is a generalized perspective view of a handheld computing device of FIG. 6A showing the visual display in the expanded and ready state in accordance with an exemplary embodiment.

FIG. 6B shows handheld computing device 600 in a fully expanded state. In the fully expanded state, visual display support 640 is elongated and locked into place to support and anchor visual display 620 in an expanded state. In the expanded state, visual display 620 is pulled from retracting mechanism 630 and attached to visual display support 640.

According to an exemplary embodiment, visual display 620 can be retracted and stored when not in use. Storage of the visual display has the advantage of reducing the size of handheld computing device 600 for convenient transport. According to an exemplary embodiment, storage of visual display 620 can have the additional advantage of protecting the display screen within a retracting apparatus casing.

According to an exemplary embodiment, visual display 620 can be pulled out and attached to visual display support 640 during use. Expansion has the advantage of providing a visual display that is larger than the size of processing unit 610. Visual display support 640 can also be constructed to present a solid surface to support a display screen using touch screen technology. The support may allow the user to more easily use a stylus to input information.

Figure 7:
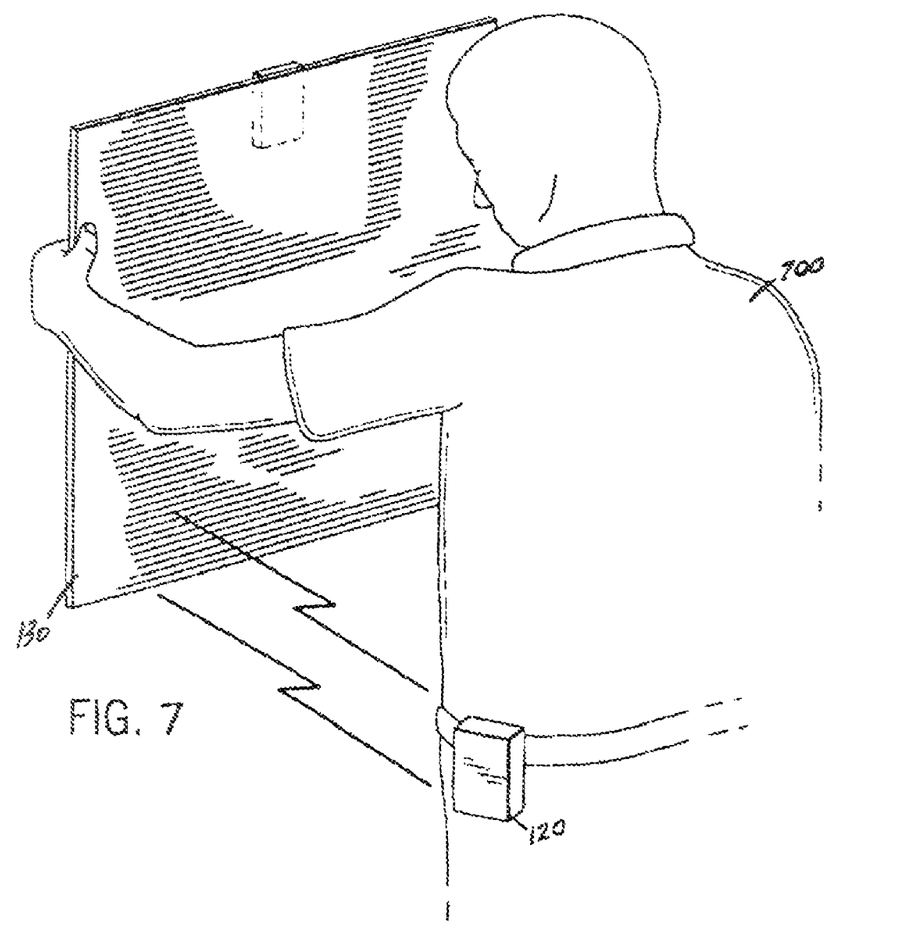
FIG. 7 is a generalized perspective view depicting a method of viewing the visual display unit in accordance with an exemplary embodiment.

FIG. 7 is a partial generalized perspective view illustrating a method of using handheld computing device 110. Using this method the user can store the relatively heavy processing unit 120 on a belt or in a desk, while holding aloft visual display 130. Using this method, user 700 does not have to support the additional weight of processing unit 120 while viewing data.

Figure 8:
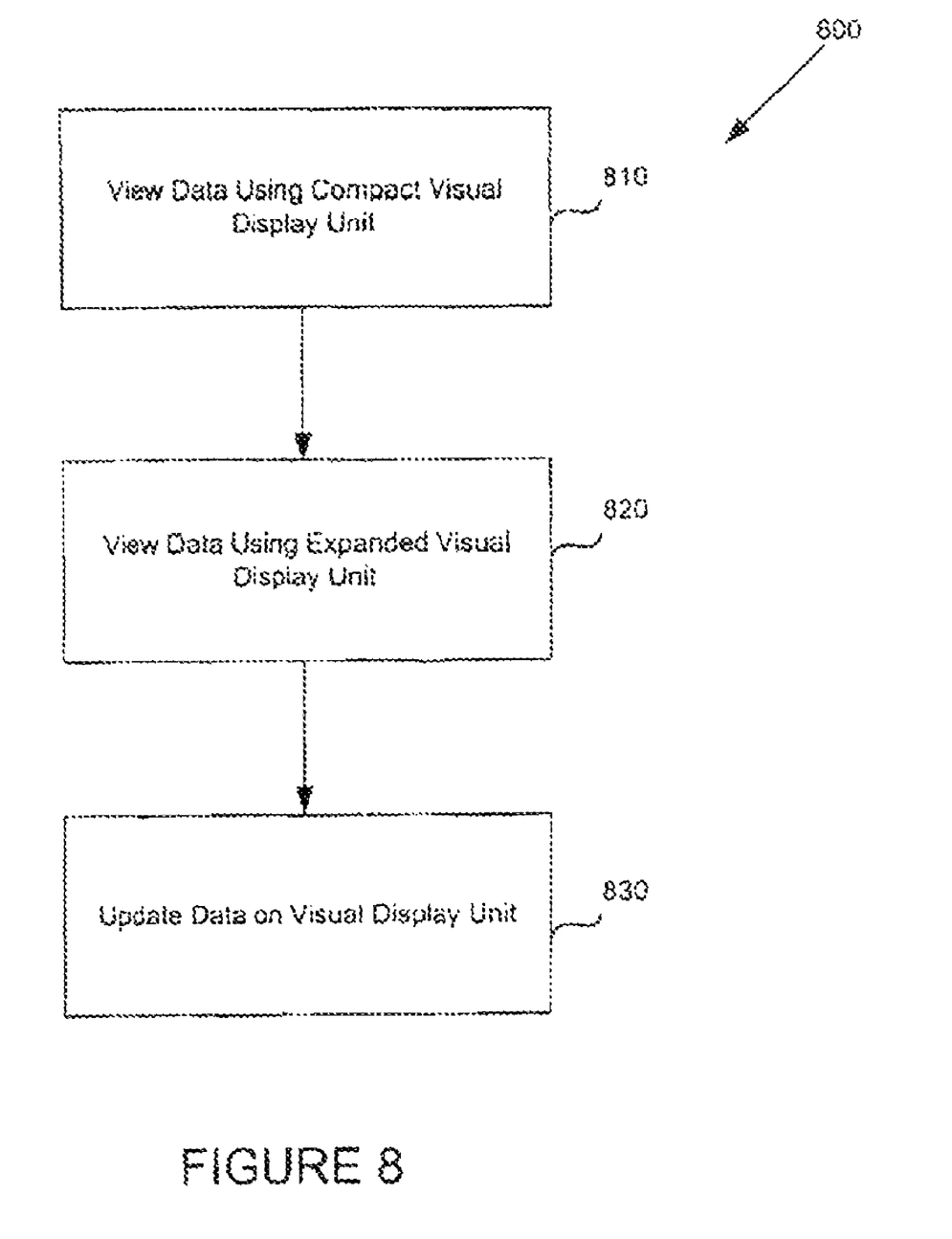
FIG. 8 is a flow diagram illustrating an exemplary embodiment of a process of displaying data using an expandable visual display system in accordance with an exemplary embodiment.

FIG. 8 is a flow diagram 800 illustrating an exemplary embodiment of a method for displaying data using expandable visual display system 130 or like display system according to an exemplary embodiment.

In use, the user views data on visual display unit 130 in the compact state (step 810). Visual display unit 130 can be viewed while attached to processing unit 120 or it can be detached and viewed. The ability to view the display in a compact state has the advantage of allowing the user quick access to information and offers all of the advantages of a traditional display from a handheld computing device.

According to an alternative exemplary embodiment, display unit 130 can be detached from processing unit 120 prior to viewing. This has the advantage of only requiring that the user hold aloft the weight of visual display unit 130 when accessing information.

The user may then expand visual display unit 130 to present a larger display area 132 (step 820). This allows the user to view data on a display similar to the size of a standard computer monitor. This is particularly advantageous when viewing large documents or images. The large display allows the user to easily see data displayed.

In the expanded state, data on the visual display unit may be updated (step 830). This data can be updated in one of three ways. It can be updated using information stored in visual display unit memory 220, it can be connected to processing unit 120 to transfer information over connection ports 128 and 134, or it can be updated using information transferred from processing unit 120 over wireless transceivers 172 and 174.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A peripheral device for operation in conjunction with a wireless communication device, the peripheral device comprising:
   a user interface configured to receive user input data;
   a communication interface coupled to the user interface, configured to receive information associated with a current display image, said current display image including an actionable item, along with information associated with the actionable item from the wireless communication device, wherein the information associated with the current display image and the information associated with the actionable item is received through a wireless connection, and wherein the information associated with the actionable item is received during a time period while the wireless connection is otherwise idle;
   a processor configured to generate the current display image based on the information associated with the current display image received from the wireless communication device; and
   a screen coupled to the communication interface, configured to display the current display image,
   wherein responsive to receiving, by the user interface, a user input selecting the actionable item in the current display image, the processor is configured to generates a subsequent display image based on the information associated with the actionable item received from the wireless communication device, and the display is configured to displays the subsequent display image.

2. The peripheral device of claim 1, wherein the wireless communication device comprises a handheld computing device.

3. The peripheral device of claim 2, wherein the screen is larger than a screen on the handheld computing device.

4. The peripheral device of claim 2, wherein the screen comprises at least one selected from a group consisting of: a touch screen, a track ball, and a scrolling roller switch.

5. The peripheral device of claim 1, wherein the actionable item comprises a hypertext link, and the information associated with the actionable item comprises data referenced by the hypertext link.

6. The peripheral device of claim 1, wherein the actionable item comprises a thumbnail image in the current display image, and the information associated with the actionable item comprises a full sized image represented by the thumbnail image.

7. A method for operating a peripheral device in conjunction with a wireless communication device, comprising:
- receiving, by the peripheral device, information associated with a current display image, said current display image including an actionable item, along with information associated with the actionable item from the wireless communication device, wherein the information associated with the current display image and the information associated with the actionable item is received through a wireless connection, and wherein the information associated with the actionable item is received during a time period while the wireless connection is otherwise idle;
- generating, by the peripheral device, the current display image based on the information associated with the current display image received from the wireless communication device;
- displaying, by the peripheral device, the current display image;
- receiving, by the peripheral device, a user input selecting the actionable item in the current display image;
- generating, by the peripheral device and in response to receiving the user input, a subsequent display image based on the information associated with the actionable item received from the wireless communication device; and
- displaying the subsequent display image.

8. The method of claim 7, wherein the wireless communication device comprises a handheld computing device.

9. The method of claim 8, wherein a screen of the peripheral device is larger than a screen on the handheld computing device.

10. The method of claim 9, wherein the screen of the peripheral device comprises at least one selected from a group consisting of: a touch screen, a track ball, and a scrolling roller switch.

11. The method of claim 7, wherein the actionable item comprises a hypertext link, and the information associated with the actionable item comprises data referenced by the hypertext link.

12. The method of claim 7, wherein the actionable item comprises a thumbnail image in the current display image, and the information associated with the actionable item comprises a full sized image represented by the thumbnail image.

* * * * *